D. J. SHAW.
MILK BOTTLE SAFE.
APPLICATION FILED OCT. 20, 1917.
1,325,453.
Patented Dec. 16, 1919.
4 SHEETS—SHEET 1.
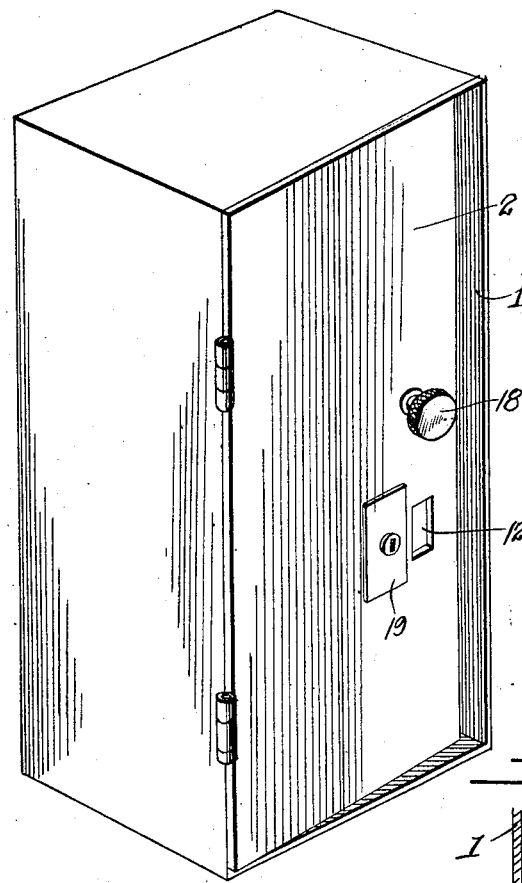
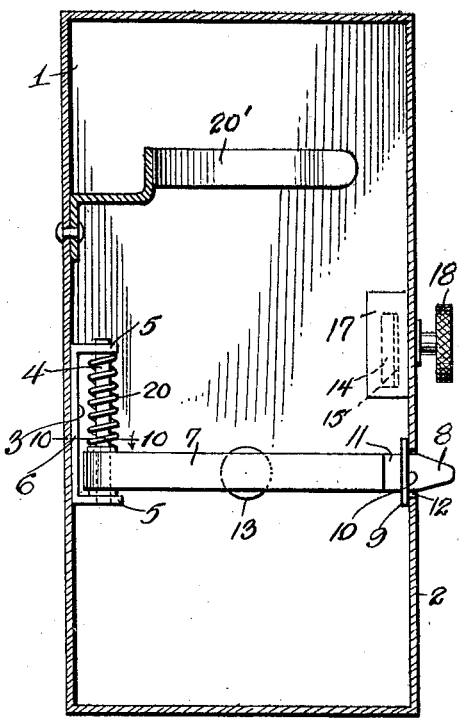
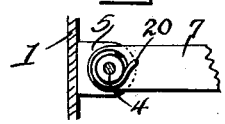
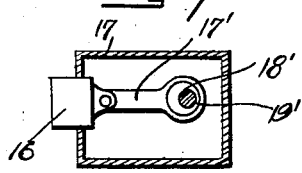
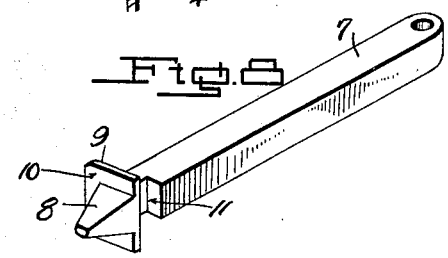
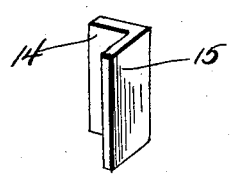

D. J. SHAW.
MILK BOTTLE SAFE.
APPLICATION FILED OCT. 20, 1917.
1,325,453.
Patented Dec. 16, 1919.
4 SHEETS—SHEET 2.
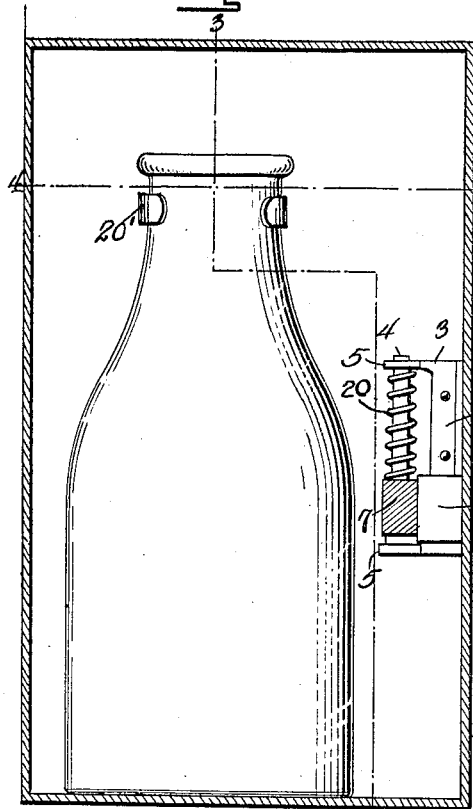
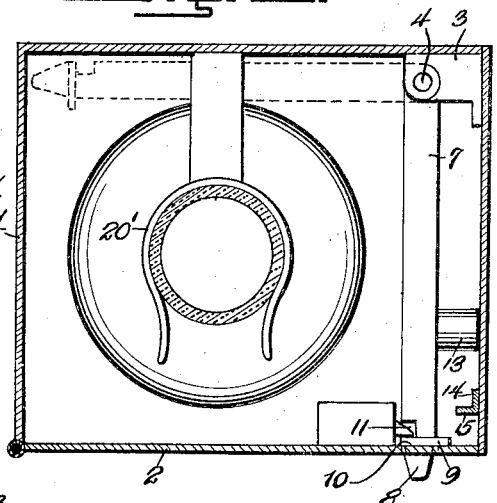
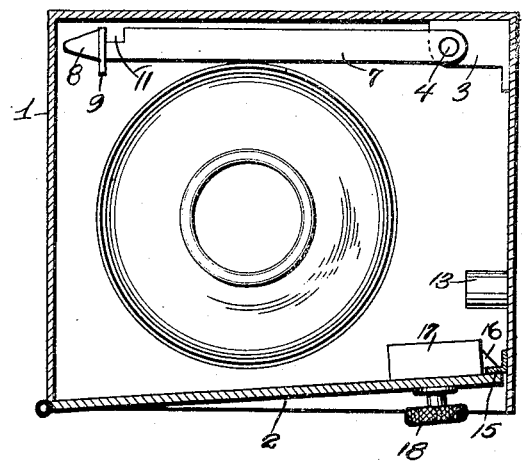
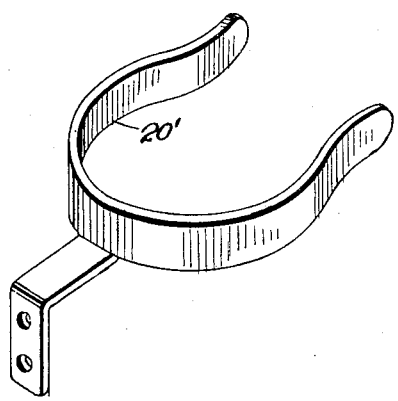
Inventor
D. J. Shaw.
By Lancaster and A. Warne
Attorney D. J. SHAW.
MILK BOTTLE SAFE.
APPLICATION FILED OCT. 20, 1917.
1,325,453.
Patented Dec. 16, 1919.
4 SHEETS—SHEET 3.
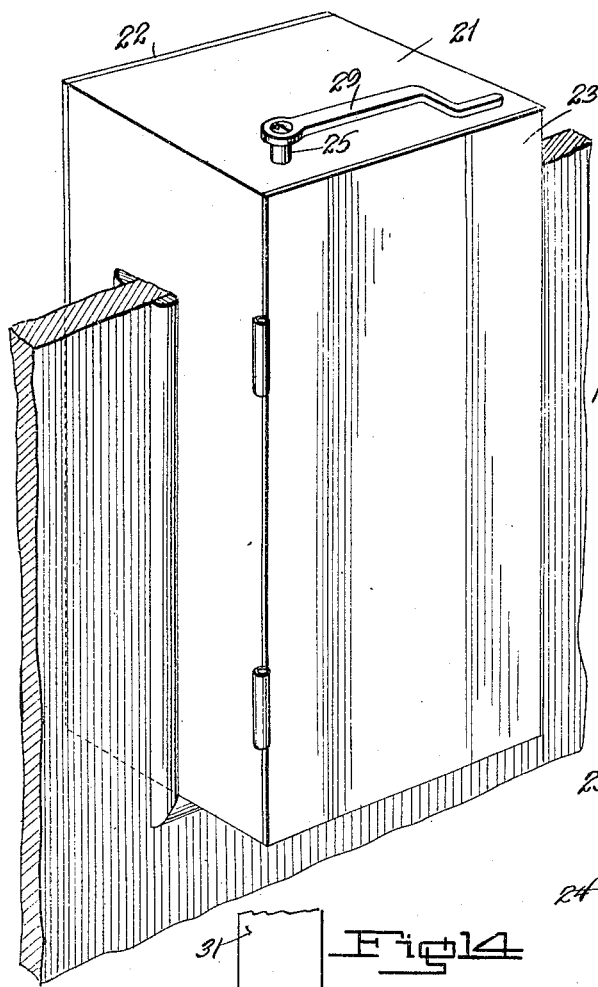
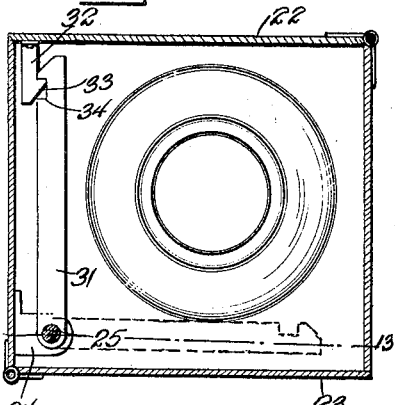
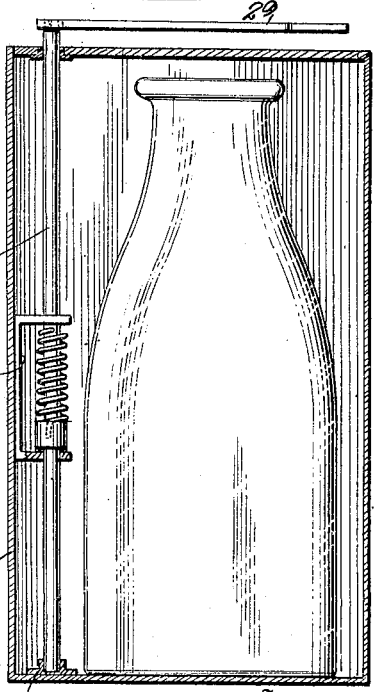
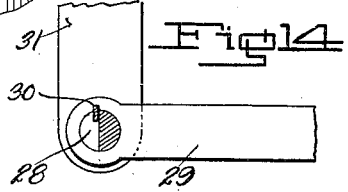
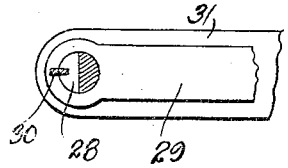
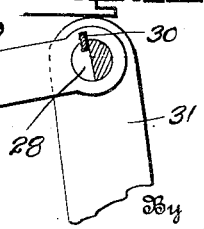
Inventor
D. J. Shaw
By Lancaster and A. Alwine
his Attorneys

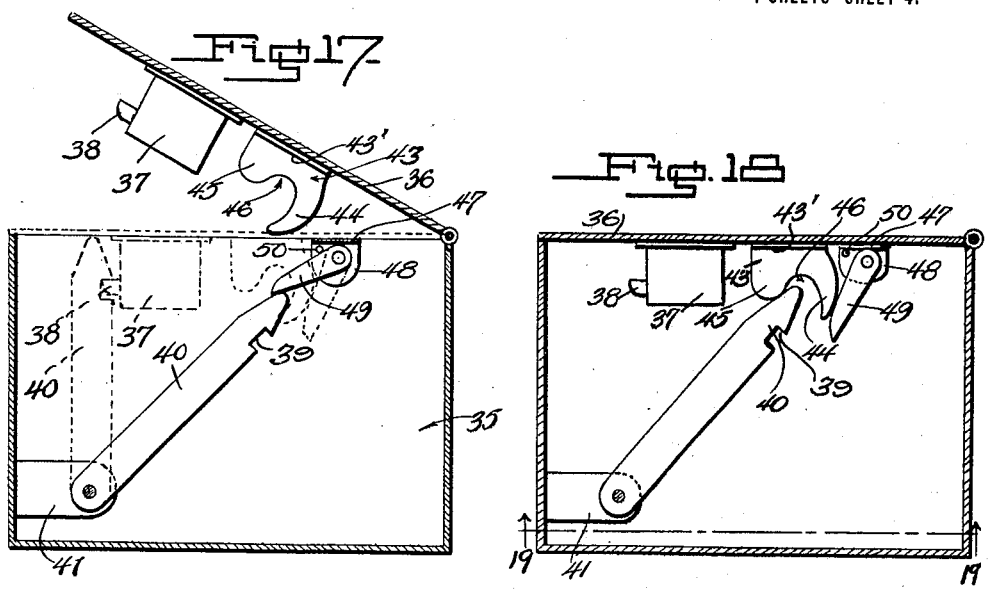
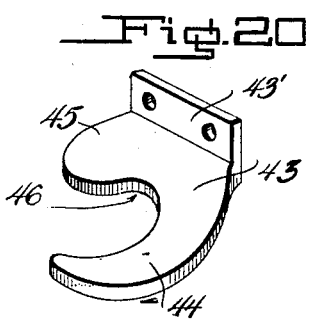
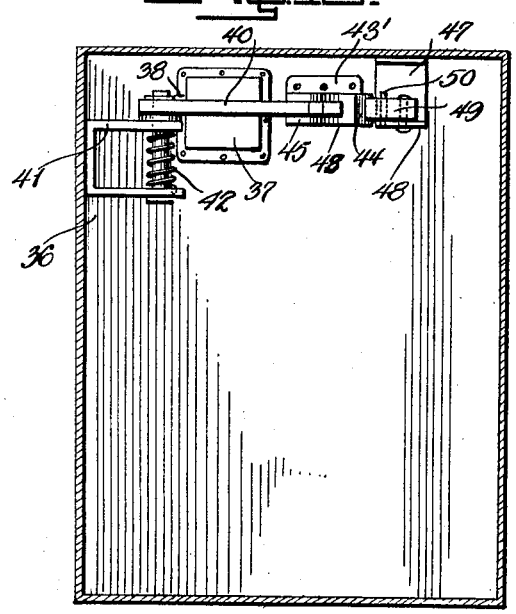
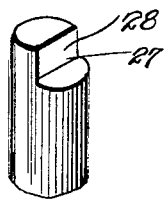

UNITED STATES PATENT OFFICE.

DAVID J. SHAW, OF KINGSTON, NEW YORK.

MILK-BOTTLE SAFE.

1,325,453.  Specification of Letters Patent.  Patented Dec. 16, 1919.

Application filed October 20, 1917. Serial No. 197,672.

*To all whom it may concern:*

Be it known that I, DAVID J. SHAW, a citizen of the United States, and a resident of Kingston, in the county of Ulster and State of New York, have invented certain new and useful Improvements in Milk-Bottle Safes, of which the following is a specification.

This invention relates to safety self-locking receptacles and more particularly to an improved receptacle or container for receiving delivered merchandise or household commodities and retaining them against removal or theft by unscrupulous persons.

One of the principal objects of the invention is to provide a device of this character for containing milk bottles constructed to receive both empty and full bottles whereby the dealer may prevent theft of empty bottles and the patron or customer will be assured of receiving a full bottle.

A further object of the invention is to provide a receptacle of this character that will require insertion of an empty bottle before the mechanism within the device will be placed in position for receiving a full bottle thus assuring delivery of the empty bottle by the patron or customer to the vender.

It is a further object of the invention to provide a receptacle having mechanism that will automatically swing to operative position for locking the receptacle when the vender removes an empty bottle and places a full bottle therein, thus obviating the necessity of requiring a key to lock the receptacle.

A further object of the invention is to provide a receptacle which may be constructed in various forms and which will consist of comparatively few parts and be simple in construction but durable and well adapted to withstand the rough usage to which devices of this kind are ordinarily subjected.

For a full description of the invention and the advantages and merits thereof, reference is to be had to the following description and the accompanying drawing wherein is illustrated the preferred form of my invention and in which—

Figure 1 is a perspective view of the device showing one form of the invention.

Fig. 2 is a vertical transverse section.

Fig. 3 is a vertical section taken substantially on the line 3—3 of Fig. 2.

Fig. 4 is a horizontal section taken on the line 4—4 of Fig. 2.

Fig. 5 is a view similar to Fig. 4 showing the mechanism in different positions.

Fig. 6 is a perspective view of a detail of the invention.

Fig. 7 is a section through the manually operated lock.

Fig. 8 is a detail perspective of the locking bar.

Fig. 9 is a perspective view of a fragment of the invention.

Fig. 10 is a section taken substantially on the line 10—10 of Fig. 3.

Fig. 11 is a perspective view of a modified form of the invention.

Fig. 12 is a horizontal section through the form shown in Fig. 11.

Fig. 13 is a vertical section taken substantially on the line 13—13 of Fig. 12.

Figs. 14, 15 and 16 are small details illustrating different positions of the locking bar.

Fig. 17 is a horizontal section illustrating a further modification of the invention.

Fig. 18 is a view similar to Fig. 17 illustrating the locking position of the mechanism.

Fig. 19 is a section taken on the line 19—19 of Fig. 18.

Fig. 20 is a perspective view of a detail of the invention.

Fig. 21 is a further detail of the invention.

Referring particularly to Figs. 1 to 10 of the drawings, wherein is illustrated one form of my invention, the receptacle or container 1 is of box like construction and large enough to receive an ordinary milk bottle. It will be understood, however, that the receptacle may be adapted to receive as many milk bottles as desired according to its contemplated capacity when constructed. A hinged door 2 is provided on the front of the receptacle and is adapted to swing outwardly for gaining access to the interior of the receptacle and, as shown clearly in Figs. 1 and 5 of the drawing, this closure or door may be swung slightly inwardly for a purpose that will presently appear. In the corner of the receptacle, diagonally opposite the hinges for the closure, I have provided a spring hinge 3 which includes a pintle 4 mounted on and extended through flanges 5 secured by a plate 6 to the wall of the receptacle. A locking arm 7 is provided at one end with an aperture for the reception of the pintle 4 whereby the locking arm 7 may freely swing in a horizontal plane. The outer terminal of the locking arm 7 is tapered to form a stud 8 and at the base of the stud is a flange 9 forming a shoulder 10. Contiguous with the shoulder, and formed in the edge of the locking arm 7 is a notch 11. In the door or closure 2 is a square aperture 12 situated to register with the stud 8 when the locking arm is swung to forwardly extended position and the door is moved to closed position, as shown in Fig. 4 of the drawing.

Mounted on the side wall of the container adjacent the locking arm is a bumper or buffer pad 13 disposed in a position to be engaged by the locking arm to limit the swinging movement of the same and maintain it in the desired position for registration with the opening 12. On the same wall of the container is attached a plate 14 having a lip 15 extended vertically and slightly spaced from the marginal edge of this wall of the receptacle. This lip is engageable by the edge of the door 2 when the latter is thrust inwardly as shown in Figs. 1 and 5, and the lip 15 also serves to retain the closure in locked position inasmuch as the lip is engaged by the latch 16 of a manually operated lock 17 which has a knob 18 extended from the exterior side of the door in a position to permit it to be operated by the vender of the merchandise to be placed in the receptacle.

Since the large diameter of the ordinary milk bottle is nearer its lower end, I have mounted the locking arm 7 in a plane slightly below the center of the container so that the locking arm will engage the surface of the bottle at its widest portion. The lock 17, therefore, is disposed above the opening 12. In order that the normal tendency of the locking arm will be to swing into engagement with the bumper pad 13, I have provided a coil tension spring 20 on the pintle 4, one end of the spring being secured to the uppermost flange 5 while the opposite end of the spring is attached to the locking bar 7 as shown in Fig. 10 of the drawing. A key operated lock 19 of any preferred type is mounted in the door adjacent the opening 12, and the latch of the lock is adapted for engagement in the notch 11 in the locking bar when the latter is moved to operative position for locking the closure as shown in Fig. 4. When the locking bar is in this position, the door engages the shoulder 10 of the flange 9 and the surface of the door is flush with the marginal edge of the container.

Assuming that the receptacle is empty, the mode of operation is as follows:

The customer or person opens the door 2 and grasps the locking arm 7 and swings the same to the position shown by dotted lines in Fig. 4. An empty milk bottle is then placed within the receptacle and engaged by the spring retaining yoke 20′ which embraces the neck of the bottle. This action will hold the locking arm 7 at the rear of the container and against the action of the coil spring 18, the normal tendency of which is to urge the locking arm to outwardly extended position. The door 2 will then be closed and pressed slightly inwardly of the receptacle until it engages the lip 15 thereby causing the latch 16 of the lock 17 to engage behind the lip for holding the door in closed position. The vender opens the door by simply turning the knob 18 and in this connection it is pointed out that a key operated lock may be substituted for the lock 17 if desired. In this instance, the vender will retain a master key adapted to fit any of the locks on a plurality of the boxes in the possession of various customers or patrons of the dealer.

After removing the empty bottle from the receptacle, the locking arm 7 will immediately swing to outwardly extended position, as shown by full lines in Fig. 4, and this swinging movement will be limited by engagement with the buffer pad 13 which should be constructed of rubber or other suitable resilient material. The dealer will then place a full bottle within the receptacle and swing the door to closed position. The stud 8 will register with the opening 12 in the door and the latch on the lock 19 will immediately engage the notch 11 in the locking arm and, this lock, being a snap lock will cause the door to be locked against opening until such time as it is actuated by a key in possession of the owner. As shown in Fig. 1 of the drawing, the keyhole for this lock is exposed in a position whereby it may be conveniently reached by the customer and it will be obvious that any type of key operated lock may be employed for this purpose.

In Fig. 7, I have illustrated a type of manually operated lock which may be employed and which consists of the sliding latch 16 connected to a link 17′ one end of which embraces a cam 18′ on the end of a stud 19′ which is carried by the knob 18. Thus, when the knob 18 is turned, the cam 18′ will immediately cause the link 17′ to draw the latch 16 into the locked casing for disengaging the latch from the lip 15. I desire it to be understood that I may use any type of manually operated lock in this connection.

In Figs. 11, 12, 13, 14, 15, 16 and 21 I have illustrated a modified form of the invention and in this instance, the container 21 is provided with an outer door 22 and an inner door 23 and the container is preferably mounted in a wall or door panel so that the inner door 23 can only be opened by a person on the interior of the dwelling while the door 22 is accessible only to the vender or persons on the exterior. Vertically disposed and attached to one side of the container 21 is a spring hinge 24 which includes the elongated pintle 25 having one end journaled in the bottom of the container as indicated at 26 while the opposite end projects through the top of the container. This extended end of the pintle 25 has a portion removed, as indicated at 27 and shown to advantage in Fig. 21 of the drawing. This structure provides a recess 28 and when the handle 29 is mounted on the end of the pintle, the recess 28 receives the extended end of a key 30 which is carried by the end of the operating arm or handle 29. This arm is exposed above the receptacle and on the interior of the dwelling whereby the lever will be inaccessible from the exterior of the dwelling. The locking arm 31 is mounted on the pintle 25 and is engaged by the hinge which forms a part of the spring hinge whereby the tendency of the locking arm is to swing to horizontal laterally extended position as shown in full lines in Fig. 12. The door 23, being on the interior of the dwelling, of course, requires no lock. The door 22, however, is provided with a right angularly projecting latch 32 having a lip 33 adapted to engage a notch 34 in the end of the locking arm 31. This latch automatically engages the notch when the door 22 is swung to closed position by the dealer after the milk bottle has been placed within the container.

Assuming that the container is empty, the patron will place an empty milk bottle within the receptacle thus swinging the arm 31 to the position shown in dotted lines in Fig. 12. The arm then will be held in engagement with the bottle since the tendency of the spring in the spring hinge is to urge the arm outwardly. When the arm is in this position, the latch 32, of course, will not be engaged and the door 22 may be readily opened. The dealer, therefore, will open the door 22 and remove the empty bottle which will cause an immediate swinging of the arm 31 to the position shown in full lines in Fig. 12. The full bottle may then be placed within the receptacle and the door 22 swung to closed position whereupon the lip 33 will engage the notch 34 and the door 22 will be held locked and persons on the exterior will be frustrated in any attempt to open the door 22. The customer, may remove the full bottle by opening the door 23. It will be apparent, however, that the arm 31 may be more readily moved by operating the lever 29 which, as shown in detail in Figs. 14, 15 and 16, will permit swinging movement of the locking bar 31 until such time as the key 30 has moved through the semi-circular recess provided by the notched end of the pintle. When the parts 30 and 31 are in the position shown in Fig. 14, the operator may move the locking bar 31 to the position for engaging the empty bottle without necessarily disturbing the handle 29 as shown in Fig. 15. When the locking arm 31 is to be swung outwardly through the doorway closed by the door 23, however, in order to insert an empty bottle, the lever 29 will be swung to the position shown in Fig. 16 thus causing the arm 31 to swing outwardly of the container to permit the insertion of an empty bottle.

In Figs. 17, 18, 19 and 20, I have illustrated a slightly further modified form of the invention especially adapted for use in delivering merchandise in the form of packages or tied bundles. The container 35 is provided with a hinged closure 36, the latter having a lock 37 upon its inner surface. This lock is provided with a sliding latch 38 adapted to engage a notch 39 in the locking lever 40 pivotally mounted on a spring hinge 41 similar to the spring hinges in the above described forms. The spring 42 in this hinge is adapted to normally urge the arm 40 to extended position as shown by dotted lines in Fig. 17, whereby the notch 39 may be engaged by the latch 38 of the lock 37.

Mounted on the door 36, adjacent the lock 37 is a safety keeper 43 shown in detail in Fig. 20, which consists of a flange 43' adapted to be secured to the door and from which projects an arcuate tongue 44 and a curved plate 45. The elongated curve tongue 44 in the position shown, provides an arcuate or curved recess 46 between the tongue and the curved plate 45. Attached to the top of the receptacle is a securing plate 47 which has a depending flange provided with a laterally extended plate 48 upon which a retaining latch 49 is pivotally mounted. This plate also carries a pin 50 with which the latch 49 is engaged when the latch is in operative position. In Fig. 18, I have illustrated the position of the various parts of this form of the invention when the patrons leave the receptacle ready to receive a parcel or package delivered by a carrier or vender. It will be noted that the plate 45 is in engagement with the end of the locking arm and the tongue 44 is in engagement with the latch 49 and the door is unlocked. It is simply necessary for the person delivering the package to swing the door to opened position and the spring 42 will immediately cause the arm 40 to swing into the position shown in dotted lines in Fig. 17. As soon as the package is placed within the receptacle, the door will be swung to closed position and the latch 38 will immediately engage the notch 39 in the locking arm and thus lock the door and prevent the same from being opened unless a key, adapted to operate the lock 37 is employed. In order that the customer may be assured that the locking arm 40 is disposed in the proper position to be engaged by the plate 45, I have provided the above mentioned latch 49 which, as shown in full lines in Fig. 17, will be placed in the position to be engaged by the end of the locking arm 40 before the door is swung to closed position. The end of the latch, therefore, will hold the locking arm in a position to cause engagement of the plate 45 with the end of the arm since the tongue 44 will force the latch inwardly and the same will slip over the end of the locking arm while the latter returns to be engaged by the plate 45. The arm 40, therefore, is held in a position that will permit it to immediately swing to forwardly projecting position when the door 36 is opened. In order that parcels and packages may be readily placed within the container, I have mounted the mechanism adjacent the top end as shown to advantage in Fig. 19 of the drawing.

From the foregoing it will be observed that a very simple and durable safety receptacle has been provided the above described forms of which include the preferred embodiment. I desire it to be understood, however, that slight changes may be made in the minor details of construction without departing from the spirit of the invention or the scope of the claims hereunto appended.

I claim:

1. In a safety receptacle, the combination of a casing having a hinged door, a latch carried by the door, a locking arm having a notch engageable by the said latch when the door is moved to closed position, means for normally urging the said locking arm to position for engaging the said latch, the said locking arm being adapted for movement in the said container whereby it may be held out of normal position by engagement with the contents of the said container.

2. A safety receptacle for milk bottles comprising a container having a hinged door, means engageable with the milk bottle for maintaining the latter in a fixed position within the container, a locking arm pivotally mounted within the container and having tensioning means for normally urging the said locking arm to extend toward the door, the said arm being engageable by the bottle for holding it against the action of the said means in transversely extended position with respect to the said door, and means carried by the door and engageable with the locking arm to maintain the door in closed position when the door is closed and the said locking arm disengaged from the bottle.

3. A safety receptacle for milk bottles comprising a casing having a hinged door, a locking arm provided within the casing and having a notch formed on one end and a stud formed at its terminal, the said door being provided with an opening for the reception of the said stud, means for normally urging the said locking arm to position for registration with the said opening when the door is closed, and means for receiving the said door to limit the inward movement of the same and including a latch carried by the door and engageable with the means for maintaining the door in position slightly within the said casing when the door is closed.

4. A safety receptacle for milk bottles, comprising a container, a door hingedly mounted on the container and provided with a manually operated and a key operated lock, a locking arm pivotally mounted within the container and adapted to be engaged by the said key operated lock when the said arm is extended toward the said door, and means carried by the container and engageable with the said manually operated lock for maintaining the door in closed position when the said arm is swung to position for disengaging the said door.

5. A safety receptacle for milk bottles comprising a container having a door hingedly mounted on the container, the said door being provided with a key operated and a manually operated lock, means mounted within the container and adapted for engagement by the bottle therein to maintain the said means out of engagement with the said door, tensioning means for normally urging the first mentioned means into engagement with the door for contact with the said key operated lock when the said door is closed and flush with the edge of the said container, and means carried by the container and engageable with the manually operated lock when the said first mentioned means is held by the bottle within the container in a position remote from the said door.

6. A safety receptacle for milk bottles comprising a container having a door hingedly mounted thereon, the door being provided with a key operated and a manually operated lock, a locking arm pivotally mounted within the container and having tensioning means normally urging the said locking arm to engage the said door, a bumper pad for limiting the swinging movement of the said locking arm, means for holding a bottle within the container in fixed position, the same locking arm being engageable by the bottle when disengaged from the door to maintain the arm in inoperative position, and a lip carried by the container and engageable with the said manually operated lock for holding the door slightly inwardly of the container when in closed position.

DAVID J. SHAW.